United States Patent

Manoogian et al.

[11] 3,906,999
[45] Sept. 23, 1975

[54] LIQUID VALVE

[75] Inventors: Alex Manoogian, Grosse Pointe Farms; Eric V. Pullen, Southfield, both of Mich.

[73] Assignee: Masco Corporation of Indiana, Taylor, Mich.

[22] Filed: Nov. 29, 1974

[21] Appl. No.: 528,443

[52] U.S. Cl. ...... 137/625.32; 137/625.41; 251/174; 251/208; 251/317
[51] Int. Cl.² ......................... F16K 13/04
[58] Field of Search....... 137/625.31, 625.32, 625.4, 137/625.41; 251/172, 208, 317, 174

[56] References Cited
UNITED STATES PATENTS

| | | | |
|---|---|---|---|
| 1,998,830 | 4/1935 | Beebe | 251/355 X |
| 2,578,396 | 12/1951 | Brown | 251/317 |
| 3,167,086 | 1/1965 | Michalski | 251/317 X |
| 3,472,279 | 10/1969 | Sanderson | 137/625.41 |

Primary Examiner—Harold W. Weakley
Attorney, Agent, or Firm—E. Dennis O'Connor

[57] ABSTRACT

A liquid valve in which the valve member has a convex portion seated against a concave surface of the valve housing into which a liquid inlet passage opens. A sealing member is positioned in the inlet passage, has an opening formed therethrough to permit the passage of liquid and is urged by liquid pressure in the inlet passage toward the valve member. The valve member is formed with an elongate slot and is movable between an off position closing the inlet passage and a plurality of on positions where the slot interconnects the inlet passage and an outlet passage extending through the valve housing. The valve member is shaped proximate the slot so that valve structure prevents the displacement of the sealing means due to liquid pressure while maximizing liquid volume flow in the on positions.

11 Claims, 5 Drawing Figures

LIQUID VALVE

BACKGROUND OF THE INVENTION

A type of liquid valve that has proven extremely successful as a water faucet valve both from technical performance and commercial acceptance standpoints is a valve that utilizes liquid pressure in the input passage, alone or in combination with a spring force, to bias a sealing washer of special design into sealing engagement with a valve member. In this manner, liquid pressure does not work against the anti-leak valve design features, but actually aids in sealing. Such valves most commonly include spherical or ball valve members as disclosed by U.S. Pat. Nos. 3,056,418 and 3,417,783, but also may utilize a disc valve member as disclosed by U.S. Pat. No. 3,384,119. The former have proven especially desirable because of ease of manufacture and assembly and public acceptance of faucet handle moving patterns made possible by ball valve member designs.

Recently in the art, greater stress has been placed on faucet valve designs that are quiet in operation. In this respect, it is well known that the noise generated by abrupt changes in the direction of liquid flow is a large contributing factor to faucet operation noise. Such abrupt changes of direction almost are univeral in ball valve faucets having water flow passages extending through the valve members. However, ball valves are known in the art that do not utilize water flow passages through the valve members and which thus may include water flow patterns greatly reducing abrupt flow direction changes. Examples of such valves are disclosed by U.S. Pat. Nos. 2,592,062 and 3,422,849.

Heretofore, to our knowledge, such ball valves without valve member passages have relied entirely on sealing means such as O-rings and diaphragms that must act against the force of water pressure. This is because it has not proven feasible to include in such valves water input passage seals that utilize water pressure to aid in effecting a seal as are described above and shown in said U.S. Pat. Nos. 3,056,418, 3,417,783 and 3,384,119. In this respect, the problems which have arisen include difficulty in maintaining water input passage seals in proper location and orientation and inability to provide, in a valve of commercially practical size, the desired magnitude of water flow volume.

It is, therefore, an object of this invention to provide a liquid valve especially adapted for water faucet applications that is extremely quiet in operation and that takes advantage of optimum sealing techniques known in the art. A further object of this invention is to provide a liquid valve of the ball valve member type that does not have water flow passages formed through the ball valve member and which valve includes inlet passage sealing means that take advantage of inlet liquid pressure to promote sealing. A still further object of the invention is to provide a liquid valve as described above that is capable of passing relatively large volumes of water.

SUMMARY OF THE INVENTION

A liquid valve constructed in accordance with this invention comprises housing means defining a valve chamber. Within the chamber is a valve seating surface formed on the housing means. Spaced apart liquid inlet and outlet passages extend through the housing and communicate the valve chamber with exterior of the housing. The inlet passage has a terminus at the seating surface. A valve member is positioned within the chamber and has a portion seated against the surface. Sealing means, having an opening extending therethrough, is positioned in the inlet passage at the passage terminus and partially closes the inlet passage such that the sealing means is urged by liquid pressure in the inlet passage towards the chamber and into engagement with the valve member. The valve member has a longitudinal slot formed in it and handle means extending from it to exterior of the housing. The housing means include handle control means permitting movement of the handle in a plane extending parallel to the longitudinal axis of the slot. The valve member thus is movable in response to movement of the handle means between a first position wherein the valve portion closes the inlet passage and a plurality of second positions where the slot interconnects the inlet and outlet passages and a part of the valve member portion holds the sealing means in the inlet passage against the force of liquid pressure.

DETAILED DESCRIPTION OF THE INVENTION

Figure 1:
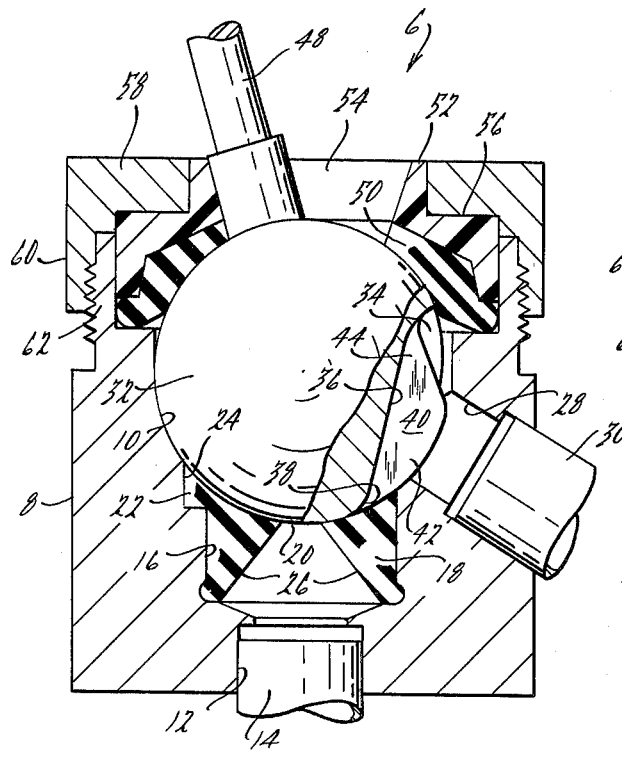
FIG. 1 is a side elevation view of the liquid valve of the invention showing the valve in an off position and with parts broken away and parts in section.
Figure 2:
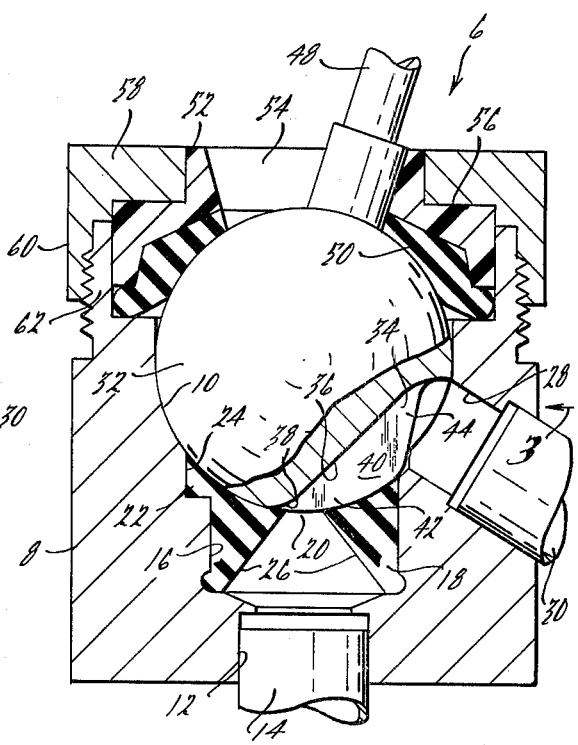
FIG. 2 is a view similar to FIG. 1 but showing the valve in the full on position.
Figure 3:
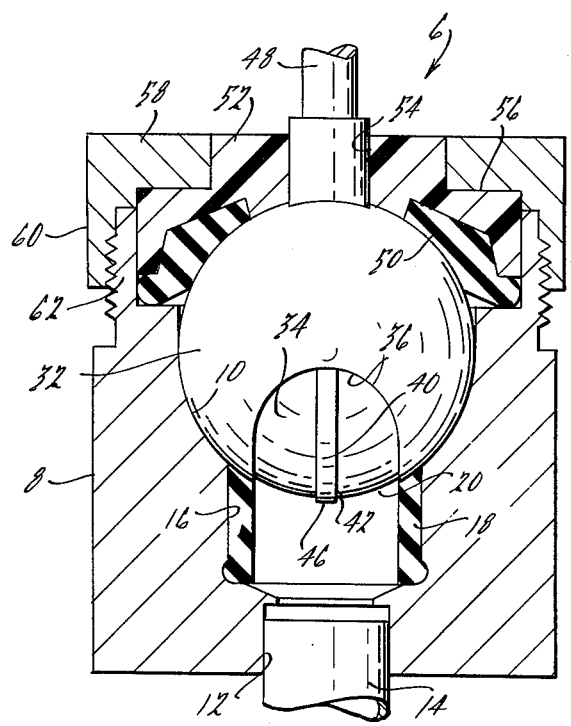
FIG. 3 is a front view of the valve of FIGS. 1 and 2, taken from the direction of the arrow 3 of FIG. 2, with parts broken away and parts in section.

Referring now in detail to the drawing, and in particular to FIGS. 1–3 thereof, the numeral 6 denotes generally a liquid valve constructed in accordance with this invention. Valve 6 includes a valve block 8 that has formed thereon an upward facing, spherical, valve seating surface 10. A liquid inlet passage 12 extends through block 8 and terminates at surface 10. Passage 12 is adapted to connect with a liquid supply pipe 14 that is connected at its other end to a pressurized liquid source.

Figure 4:
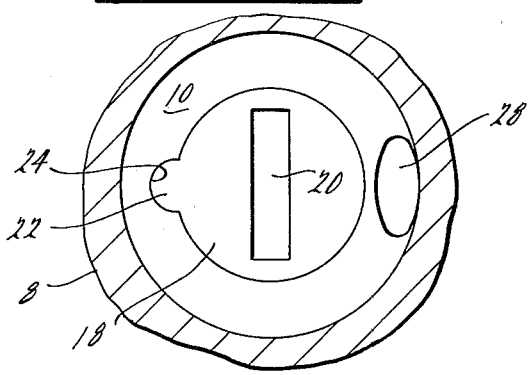
FIG. 4 is a top view of the valve of FIGS. 1–3 with the valve member and other structure removed and parts in section to show the valve sealing means.

The end of passage 12 proximate surface 10 is enlarged as at 16 and receives an elastomeric seal 18. Seal 18 may be constructed of any of a number of elastomeric materials, such as rubber. Seal 18 partially closes passage 12 and permits the flow of water therethrough due to aperture 20 that extends through the seal body. As best may be seen from FIG. 4, aperture 20 is elongate in shape, the purpose of which shape will be elaborated upon below. Seal 18 is formed with an integral projection 22 extending therefrom that is received in a mating recess 24 formed in the body of block 8. The purpose of projection 22 and recess 24 is to correctly orient seal 20 when it is assembled in block 8. The importance of the orientation of seal 18 will be discussed below. As best may be seen in FIGS. 1 and 2, a pair of converging seal walls 26 lead to opening 20 and are acted upon by the pressurized liquid in passage 12. The pressure of water on walls 26 exerts a force urging seal 18 upwards as viewed in the drawing.

An outlet passage 28 having one terminus at surface 10 extends through the body of valve block 8. Received in outlet passage 28 is a spigot member 30 that provides for the delivery of water passing through valve 6.

A ball valve member 32 is formed with at least a portion of its outer surface as a spherical section and is seated against surface 10. An elongate groove 34 is formed in valve member 32, which may be formed from metal or molded from plastic material. As may be seen from FIG. 3, the width of groove 34 preferably is approximately the same as the length of opening 20 in seal 18. The relative orientation of valve member 32 and seal 18 is such that the longitudinal axis of groove 34 lies perpendicular to the longitudinal axis of seal opening 20.

It is important to note that the root 36 of groove 34 is arcuately contoured along its length and blends smoothly as at 38 at one end of groove 34 with the outer surface of valve member 32.

Projecting radially outwardly from the root 36 of groove 34 is an elongate rib 40 that extends along the longitudinal axis of the groove. Proximate end 38 of groove 34, rib 40 has a high portion 42 that follows the profile of the outer surface of the spherical portion of valve member 32. However, approximately midway along the length of groove 34, rib 40 smoothly turns radially inwardly to a low portion 44 that smoothly blends into the root of groove 34. As may be seen from FIG. 3, the outer surface 46 of rib 44 is a spherical section having the same center as the surrounding spherical outer surface of valve member 32.

A manually operable handle 48, which may be integrally formed with or joined to valve member 32 by any suitable means, projects generally upwardly from the valve member. An elastomeric gasket 50 surrounds handle 48 and contacts the upper surface of valve member 32. A template member 52 is positioned against the uppermost surface of gasket 50 and has formed therethrough an opening 54 through which handle 48 projects to exterior of the valve. Opening 54 is an elongate slot extending parallel to the longitudinal axis of groove 34 such that manual movement of handle 48 is limited to movement in a vertical plane extending through member 32 and includes the longitudinal axis of groove 34.

An upwardly facing shoulder 56 on template 52 is engaged by a cap 58. Cap 58 includes an internally threaded, downwardly extending sleeve 60 that engages an externally threaded, upwardly extending collar 62 on valve block 8.

It thus may be seen that block 8, template 52 and cap 58 cooperate to form a composite housing having a central chamber in which the valve member 32 is positioned. By a tightening of cap 58 on threaded collar 62, gasket 50 is compressed to seal the upper end of this chamber.

With operating handle 48 in the position shown in FIG. 1, groove 34 is remote from seal opening 20 and this opening is sealed by the outer surface of valve member 32. This seal is aided by the spherically concave upper profile of seal 18 that bears against valve 32 and is urged into engagement with valve 32 by the pressurized fluid in inlet passage 12. As operating handle 48 is moved towards the right as viewed in the drawing and valve member 32 rotates about its center, groove 34 is brought into registry with seal opening 12 at end 38 of the groove. This registry permits liquid flow through groove 34 to outlet passage 28. FIG. 2 shows operating handle 48 in the extreme open position such that the entire seal opening 20 registers with the groove 34.

It readily may be appreciated that because of the smoothly contoured surface defining groove 34, abrupt angular changes in the path of liquid flow are minimized, thereby contributing to a low noise level due to the passage of water through valve 6. Another factor contributing to the minimizing of water flow noise is the elongate shape of seal opening 20. This is because as the valve cracks open, an inherently noisy valve condition, when groove 34 comes into registry with opening 20, this registry occurs along the length of opening 20 and "pin point" cracking open of the valve is avoided.

With reference to FIG. 2, it may be seen that even when the valve is in the fully open condition illustrated, and despite the relatively large cross sectional liquid flow path provided, the pressure of liquid in inlet passage 12 cannot cause movement and dislocation of seal 18 because of the presence of rib 40 in groove 34. The rib 40 abuts and holds seal 20 in position across the mid portion of the seal midway along the length of seal opening 20. This feature provided by rib 40 is important to continued proper functioning of valve 6 since a slight dislocation or "cocking" of seal 18 from the illustrated position in the large diameter end 16 of inlet passage 12 could lead to leakage as well as possible destruction of the seal during valve movement.

Figure 5:
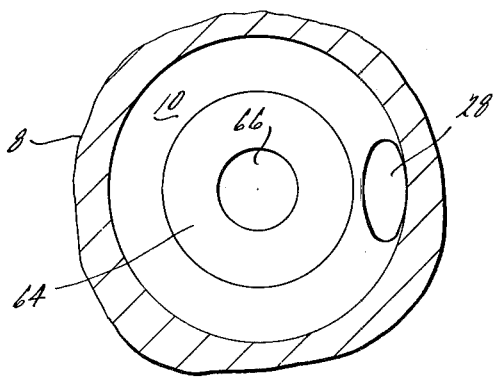
FIG. 5 is a view similar to FIG. 4 but showing an alternate embodiment of sealing means according to the invention.

FIG. 5 illustrates an alternate seal configuration wherein a seal 64 having round central opening 66 is utilized. Valve 6 will function satisfactorily at relatively low noise levels utilizing seal 64 because the smoothly contoured flow path without abrupt direction changes is provided as described above. However, use of a round seal opening such as opening 66 will allow greater operating noise during the cracking open of the valve than the embodiment of FIGS. 1–4 because the advantage described above of cracking open along an elongate staight line seal opening is not provided. However, it is possible that seal 64 may be less expensive to manufacture than seal 18 of FIGS. 1–4. Also, seal 64 does not require a particular orientation when installed in valve block 8.

It thus may be seen that this invention provides a liquid valve especially adapted for water faucet applications that has the advantages of extremely quiet operation as well as optimum sealing techniques utilizing liquid inlet pressure to promote sealing. This is accomplished by providing a valve of the ball valve type which does not have water flow passages formed through the ball valve member. Furthermore, the valve of this invention described above is of simple design and is easy to manufacture while capable of passing relatively large volumes of liquid.

We claimed:

1. A liquid valve comprising housing means defining a valve chamber, a valve seating surface on said housing within said chamber, at least a portion of said surface being concave, spaced apart liquid inlet and outlet passages in said housing means communicating said chamber with exterior of said housing means, a valve member positioned within said chamber, at least a portion of said member being convex and seated against said concave portion, sealing means having an opening therethrough positioned in said inlet passage at the end of said inlet passage proximate said chamber and partially closing said inlet passage end, said sealing means adapted to be urged by liquid pressure in said inlet passage towards said chamber and into engagement with said member, the improvement comprising: said member having a longitudinal slot formed therein, an elongate raised rib projecting from the root of said slot and extending along said slot, handle means operatively secured to said valve member and extending to exterior of said housing means, said housing means including handle control means permitting only rotational movement of said handle means and valve means about an axis of rotation passing through said ball means, said valve member being movable between a first position wherein said convex surface closes said inlet passage and a plurality of second positions wherein said slot interconnects said inlet and outlet passages, said rib bearing on said sealing means and holding said sealing means in said inlet passage against the force of liquid pressure when said valve means is in said second positions.

2. The valve of claim 1, wherein said opening in said sealing means is elongate with a longitudinal axis lying transverse to the longitudinal axis of said slot.

3. The valve of claim 2, wherein the length of said elongate opening is substantially the same as the length of said slot.

4. The valve of claim 1, wherein said rib extends along only one portion of the length of said slot, a second portion of said slot being capable of registry with said outlet passage when said valve means is in said second positions.

5. The valve of claim 4, wherein the valve member surfaces defining the beginning of said slot at said one portion of said slot are smoothly contoured and the valve member surfaces defining the termination of said rib at said second portion of said slot are smoothly contoured.

6. The valve of claim 1, wherein said concave surface and convex portion are spherical sections and the outermost surface of said rib remote from the root of said slot is a spherical section having the same center as said convex portion.

7. A liquid valve comprising housing means defining a valve chamber, a valve seating surface on said housing within said chamber, spaced apart liquid inlet and outlet passages in said housing means communicating said chamber with exterior of said housing means, said inlet passage having a terminus at said surface, a valve member positioned within said chamber, a portion of said valve member being seated against said surface, sealing means having an opening therethrough positioned in inlet passage at said passage terminus and partially closing said inlet passage, said sealing means adapted to be urged by liquid pressure in said inlet passage towards said chamber and into engagement with said valve member, the improvement comprising: said valve member having a longitudinal slot formed in the portion thereof seated against said surface, and handle means operatively secured to said valve member and extending to exterior of said housing means, said housing means including handle control means permitting movement of said handle in a plane extending parallel to the longitudinal axis of said slot, said valve member being movable in response to movement of said handle means between a first position wherein said valve portion closes said inlet passage and a plurality of second positions where said slot interconnects said inlet and outlet passages, a part of said valve member portion bearing against and holding said sealing means in said inlet passage when said valve member is in said second positions.

8. The valve of claim 7, wherein said opening in said sealing means is elongate and the longitudinal axis of said slot is perpendicular to the longitudinal axis of said opening.

9. The valve of claim 8, wherein said valve member portion includes an elongate raised rib projecting from the root of said slot and extending along at least a portion of said slot, said rib bearing on said sealing means and holding said sealing means in said inlet passage against the force of liquid pressure when said valve means is in said second positions.

10. The valve of claim 7, wherein said seating surface and said valve portion are spherical sections.

11. The valve of claim 10, wherein the outermost surface of said rib remote from the root of said slot is a spherical section having the same center as the said valve portion.

* * * * *